United States Patent
Abe et al.

(10) Patent No.: US 12,448,408 B2
(45) Date of Patent: Oct. 21, 2025

(54) METHOD FOR PRODUCING CAPPED RNA

(71) Applicant: Japan Science and Technology Agency, Kawaguchi (JP)

(72) Inventors: Hiroshi Abe, Nagoya (JP); Yasuaki Kimura, Nagoya (JP); Naoko Abe, Nagoya (JP)

(73) Assignee: Japan Science and Technology Agency, Kawaguchi (JP)

( * ) Notice: Subject to any disclaimer, the term of this patent is extended or adjusted under 35 U.S.C. 154(b) by 601 days.

(21) Appl. No.: 17/802,680

(22) PCT Filed: Feb. 19, 2021

(86) PCT No.: PCT/JP2021/006360
§ 371 (c)(1),
(2) Date: Aug. 26, 2022

(87) PCT Pub. No.: WO2021/172204
PCT Pub. Date: Sep. 2, 2021

(65) Prior Publication Data
US 2023/0097172 A1    Mar. 30, 2023

(30) Foreign Application Priority Data
Feb. 28, 2020    (JP) .................. 2020-032889

(51) Int. Cl.
*C07H 21/02*       (2006.01)
*C12P 19/34*       (2006.01)

(52) U.S. Cl.
CPC .............. *C07H 21/02* (2013.01); *C12P 19/34* (2013.01)

(58) Field of Classification Search
CPC .................. C07H 1/00; C07H 21/02
See application file for complete search history.

(56) References Cited

U.S. PATENT DOCUMENTS

2018/0273576 A1    9/2018    Hogrefe et al.

FOREIGN PATENT DOCUMENTS

WO    2017053297 A1    3/2017

OTHER PUBLICATIONS

Chu et al., Nucleic Acids Research, 1983, 11(18), p. 6513-6529. (Year: 1983).*

Leiter et al., Practical Synthesis of Cap-4 RNA, ChemBioChem, 2020, pp. 265-271, vol. 21, Wiley-VCH Verlag GmbH & Co.
Nagata et al., Synthesis and biological activity of artificial mRNA prepared with novel phosphorylating reagents, Nucleic Acids Research, 2010, pp. 7845-7857, vol. 38, No. 21, Oxford University Press.
Ohkubo et al., Chemical Synthesis of U1 snRNA Derivatives, Organic Letters, 2013, pp. 4386-4389, vol. 15, No. 17, American Chemical Society.
Sawai et al., Synthesis and Reactions of Nucleoside 5'-Diphosphate Imidazolide. A Nonenzymatic Capping Agent for 5'-Monophosphorylated Oligoribonucleotides in Aqueous Solution, J. Org Chem, 1999, pp. 5836-5840, vol. 64, American Chemical Society.
Stepinski et al., Catalytic Efficiency of Divalent Metal Salts in Dinucleoside 5', 5'-Triphosphate Bond Formation. Collection Symposium Series, 2002, pp. 154-158, vol. 5.
Piecyk et al., "5'-Terminal chemical capping of spliced leader RNAs", Tetrahedron Letters, 2012, pp. 4843-4847, vol. 53.

* cited by examiner

*Primary Examiner* — Jonathan S Lau
(74) *Attorney, Agent, or Firm* — The Webb Law Firm (57)    ABSTRACT

A method for producing a capped RNA which is an RNA having the 5'-end modified with a cap, the method including: reacting an activated capping compound represented by

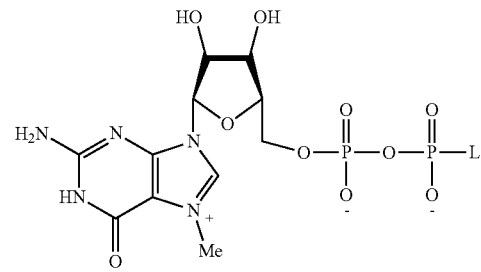

with a monophosphate RNA having the 5'-end monophosphorylated, where, L represents a leaving group. The activated capping compound is preferably a compound represented by 9 Claims, 10 Drawing Sheets

|  | ul | final conc. |
|---|---|---|
| 5'PO-RNA | 1.02 | 40 uM |
| compound 13 | 2 | 5 mM |
| ZnCl2 | 4 | 10 mM |
| anh. DMSO | 40 | |

[FIG. 2C]

| Lane | Temp. (°C) | yield (%) |
|---|---|---|
| 1 | r.t. | – |
| 2 | 37 | – |
| 3 | 55 | 22 |

[FIG. 2B]

Analyzed by 15% denaturing PAGE
(7.5 M urea, 20% formamide, 1× TBE).
20W const. 1.5 h
The gel was stained w. SYBR Green II.

[FIG. 3A]

| | ul | final conc. |
|---|---|---|
| 5'PO-RNA | 1.02 | 40 uM |
| compound 13 | 2 | 5 mM |
| MCl2 | 4 | 10 mM |
| anh. DMSO | 40 | |

| Lane | MCl$_2$ | yield (%) |
|---|---|---|
| 1 | Ni | 12 |
| 2 | Zn | 22 |
| 3 | Ca | 68 |
| 4 | Mg | 52 |
| 5 | Cu | 37 |

Analyzed by 15% denaturing PAGE
(7.5 M urea, 20% formamide, 1× TBE).
20W const. 1.5 h
The gel was stained w. SYBR Green II.

[FIG. 4A]

| | final conc. | | |
|---|---|---|---|
| | 1 | 2 | |
| 5'PO-RNA | 40 | 40 | (uM) |
| compound 13 | 5 | 5 | (mM) |
| CaCl2 | 10 | 10 | (mM) |
| 1-methyl imidazole | 0 | 1 | (M) |
| anh. DMSO | 36 | 32 | (ul) |
| total | 40 | 40 | (ul) |

| MCl$_2$ | | yield (%) |
|---|---|---|
| Ni | + | 58 |
| | − | 0 |
| Zn | + | 79 |
| | − | 14 |
| Ca | + | 83 |
| | − | 84 |
| Mg | + | 58 |
| | − | 67 |
| Cu | + | 51 |
| | − | 48 |

Analyzed by 15% denaturing PAGE
(7.5 M urea, 20% formamide, 1× TBE).
20W const. 1.5 h
The gel was stained w. SYBR Green II.

|  | 1 | 2 | 3 | 4 | final conc. |  |
|---|---|---|---|---|---|---|
| 5'PO-RNA |  |  | 100 |  |  | (uM) |
| compound 13 |  |  | 5 |  |  | (mM) |
| CaCl2 |  |  | 10 |  |  | (mM) |
| 1-methyl imidazole | 0 | 0.5 | 1 | 2 |  | (M) |
| anh. DMSO | 40 | 38 | 36 | 32 |  | (ul) |
| total |  |  | 40 |  |  | (ul) |

[FIG. 5C]

| lane | 1-methyl imidazole (mM) | yield (%) |
|---|---|---|
| 1 | 0 | 26 |
| 2 | 0.5 | 84 |
| 3 | 1 | 61 |
| 4 | 2 | 62 |

[FIG. 5B]

Analyzed by 15% denaturing PAGE
(7.5 M urea, 25% formamide, 1× TBE).
20W const. 1.5h
The gel was stained w. SYBR Green II.

[FIG. 6A]

|  | 1 | 2 | 3 | 4 | 5 | 6 | final conc. |  |
|---|---|---|---|---|---|---|---|---|
| 5'PO-RNA | 2 | 4 | 8 | 20 | 40 | 80 |  | (uM) |
| compound 13 |  |  |  | 5 |  |  |  | (mM) |
| CaCl2 |  |  |  | 10 |  |  |  | (mM) |
| 1-methyl imidazole |  |  |  | 1 |  |  |  | (M) |
| anh. DMSO |  |  |  | 34 |  |  |  | (ul) |
| total |  |  |  | 40 |  |  |  | (ul) |

[FIG. 6C]

| lane | RNA (uM) | yield (%) |
|---|---|---|
| 1 | 2 | 78 |
| 2 | 4 | 78 |
| 3 | 8 | 81 |
| 4 | 20 | 73 |
| 5 | 40 | 77 |
| 6 | 80 | 72 |

[FIG. 6B]

Analyzed by 10% denaturing PAGE
(7.5 M urea, 25% formamide, 1× TBE).
20W const. 1.0 h
The gel was stained w. SYBR Green II.

[FIG. 7A]

|  | ul | final conc. |
|---|---|---|
| 5'PO-RNA | 3.44 | 100 uM |
| compound 13 | 2 | 5 mM |
| CaCl2 | 4 | 10 mM |
| 1-methyl imidazole | 4 | 1 M |
| slovent | 40 |  |

[FIG. 7C]

1 : anh. DMSO/MQ = 1/1
2 : anh. DMSO only
3 : MQ 3.44 ul + anh. DMSO

| lane | yield (%) |
|---|---|
| 1 | 28 |
| 2 | 70 |
| 3 | 78 |

[FIG. 7B]

Analyzed by 15% denaturing PAGE
(7.5 M urea, 25% formamide, 1× TBE).
20W const. 1.5 h
The gel was stained w. SYBR Green II.

[FIG. 8A]

|  | 1 | 2 | 3 | 4 | 5 | 6 | 7 | final conc. |
|---|---|---|---|---|---|---|---|---|
| 5'PO-RNA |  |  |  | 40 |  |  |  | (uM) |
| compound 13 |  |  |  | 5 |  |  |  | (mM) |
| CaCl2 | 0 | 0.1 | 1 | 10 | 20 | 30 | 40 | (mM) |
| 1-methyl imidazole |  |  |  | 1 |  |  |  | (M) |
| anh. DMSO |  |  |  | 35 |  |  |  | (ul) |
| total |  |  |  | 40 |  |  |  | (ul) |

[FIG. 8C]

| lane | CaCl2 (uM) | yield (%) |
|---|---|---|
| 1 | 0 | 41 |
| 2 | 0.1 | 41 |
| 3 | 1 | 67 |
| 4 | 10 | 60 |
| 5 | 20 | 58 |
| 6 | 30 | 64 |
| 7 | 40 | 54 |

[FIG. 8B]

Analyzed by 15% denaturing PAGE
(7.5 M urea, 25% formamide, 1× TBE).
20W const. 1.0 h
The gel was stained w. SYBR Green II.

[FIG. 9A]

|  | 1 ul | 2 ul | 3 ul | 4 ul | final conc. |
|---|---|---|---|---|---|
| 5'PO-RNA | 3.44 | 3.44 | 3.44 | 3.44 | 100 uM |
| compound 13 | 2 | 4 | 8 | 12 | 5-30 mM |
| CaCl2 | 4 | 4 | 4 | 4 | 10 mM |
| 1-methyl imidazole | 4 | 4 | 4 | 4 | 1 mM |
| anh. DMSO | 32.56 | 32.56 | 32.56 | 32.56 |  |

[FIG. 9C]

| compound 13 (mM) | yield (%) |
|---|---|
| 5 | 68 |
| 10 | 79 |
| 20 | 84 |
| 30 | 82 |

[FIG. 9B]

Analyzed by 10% denaturing PAGE
(7.5 M urea, 25% formamide, 1× TBE).
20W const. 1.0 h
The gel was stained w. SYBR Green II.

[FIG. 10A]

|  |  | final conc. |  |
|---|---|---|---|
| 5'PO-RNA |  | 40 | (uM) |
| compound 13 |  | 10 | (mM) |
| CaCl2 |  | 10 | (mM) |
| 1-methyl imidazole |  | 1 | (M) |
| anh. DMSO | 36 |  | (ul) |
| total | 40 |  | (ul) |

1 : 5'-PO RNA
2 : compound 13
3 : CaCl₂

[FIG. 10C]

| lane | yield (%) |
|---|---|
| 1 | 81 |
| 2 | 83 |
| 3 | 80 |

[FIG. 10B]

Analyzed by 15% denaturing PAGE
(7.5 M urea, 25% formamide, 1× TBE).
20W const. 1.5 h
The gel was stained w. SYBR Green II.

[FIG. 11A]

|  | final conc. | |
|---|---|---|
|  | 1 | 2 |
| 5'PO-RNA | 40 | (uM) |
| compound 13 | 10 | (mM) |
| CaCl2 | 10 | (mM) |
| 1-methyl imidazole | 0 | 1 | (M) |
| anh. DMSO | 38 | 32 | (ul) |
| total | 40 | 40 | (ul) |

Up: 1-methyl imidazole (-)
Down: 1-methyl imidazole (+)

Analyzed by 15% denaturing PAGE
(7.5 M urea, 25% formamide, 1× TBE).
20W const. 1.5 h
The gel was stained w. SYBR Green II.

[FIG. 12A]

| 4-23 | a | b | |
|---|---|---|---|
|  | final conc. | | |
| RNA | 40 | 40 | (uM) |
| compound 13 | 5 | 5 | (mM) |
| MCl2 | 10 | 10 | (mM) |
| solvent | 40 | 40 | (ul) | a: MQ
b: 10 mM HEPES buffer (pH=7.4)

[FIG. 12C]

| MCl$_2$ | solvent | yield (%) |
|---|---|---|
| Ca | a | 72 |
|  | b | 34 |
| Mg | a | 72 |
|  | b | 30 |

[FIG. 12B]

Analyzed by 15% denaturing PAGE
(7.5 M urea, 20% formamide, 1× TBE).
20W const. 1.5 h

Analyzed by 15% denaturing PAGE (7.5 M urea, 20% formamide, 1× TBE). 20W const. 1.5 h
The gel was stained w. SYBR Green II.

METHOD FOR PRODUCING CAPPED RNA

CROSS-REFERENCE TO RELATED APPLICATIONS

This application is the United States national phase of International Application No. PCT/JP2021/006360 filed Feb. 19, 2021, and claims priority to Japanese Patent Application No. 2020-032889 filed Feb. 28, 2020, the disclosures of which are hereby incorporated by reference in their entirety.

BACKGROUND OF THE INVENTION

Field of the Invention

The present invention relates to a method for producing capped RNA having a cap structure at a 5'-end.

Description of Related Art

Figure 16:
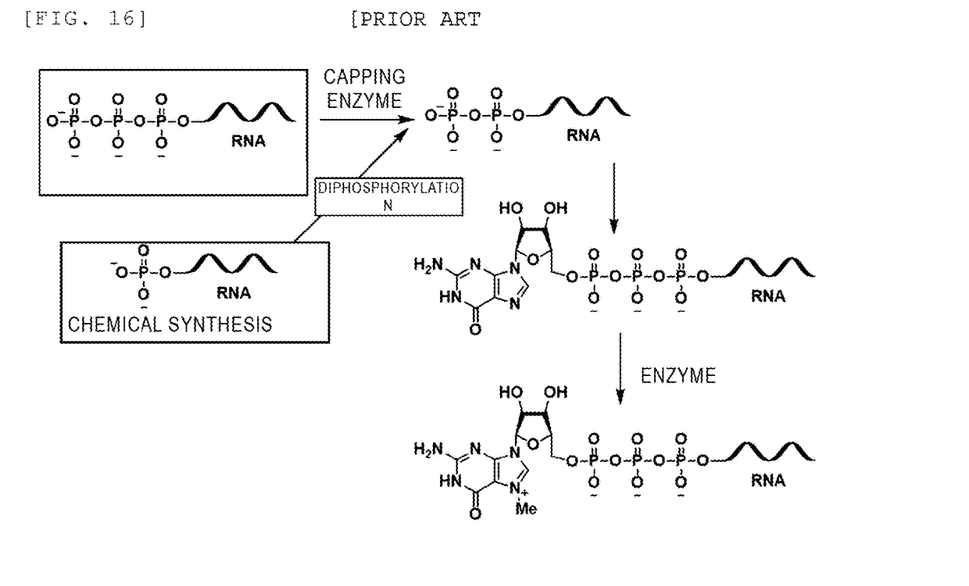
FIG. 16 is a drawing that illustrates an outline of a prior art enzymatic method for producing a capped RNA.

Eukaryotic mRNA, for example, has been known to have a 5'-capped structure in which 7-methylguanosine forms 5'-5' bond with the 5'-end via a triphosphate bond. The cap structure has been known to promote translation of mRNA, and has therefore been desired to be efficiently introduced into mRNA, in order to efficiently synthesize a target protein typically in a protein expression system.

mRNA may be synthesized by enzymatic transcription or by chemical synthesis based on the amidite method, wherein the latter is greatly advantageous in terms of easy introduction at will of chemical modification that is considered to be essential for mRNA medicine (since it contributes to improve stability and translation ability of mRNA). On the other hand, there is no known method of easily introducing the cap structure into chemically synthesized mRNA. Only technique ever known relates to diphosphorylation of the 5' end by chemical synthesis, followed by enzymatic introduction of a cap (see "Synthesis and biological activity of artificial mRNA prepared with novel phosphorylating reagents", Seigo Nagata, Tomohiro Hamasaki, Koichi Uetake, Hirofumi Masuda, Kazuchika Takagaki, Natsuhisa Oka, Takeshi Wada, Tadaaki Ohgi, and Junichi Yano, Nucleic Acids Research, 2010, 38, 7845, for example). FIG. 16 is a conceptual diagram illustrating such prior cap introduction method. According to this method, a diphosphorylated RNA is prepared by transcription synthesis with the aid of a capping enzyme or by chemical synthesis, and the cap structure is further introduced to the 5'-end with the aid of the capping enzyme.

An alternative known method of capping relates to enzymatic methylation of guanine, by way of solid-phase synthesis and activation of monophosphate (see "Practical Synthesis of Cap-4 RNA, Josef Leiter, et al., ChemBioChem 2020, for example). According to the method of this literature, an imidazole group is introduced into a monophosphate group at the 5'-end of RNA, to which a diphosphate group such as GDP (guanine diphosphate) is reacted, thereby introducing the cap structure at the 5'-end of RNA.

There is still another known method (see "Chemical Synthesis of U1 snRNA Derivatives", Akihiro Ohkubo et al., Organic Letter, 2013, for example). Also this method relies upon solid phase synthesis in which an imidazole group is introduced into a triphosphate group at the 5'-end of RNA, to which a monophosphate group such as GMP (guanine monophosphate) is then reacted, thereby introducing the cap structure at the 5'-end of RNA.

CITATION LIST

Patent Literature

Non-Patent Literature 1: "Synthesis and biological activity of artificial mRNA prepared with novel phosphorylating reagents", Seigo Nagata, Tomohiro Hamasaki, Koichi Uetake, Hirofumi Masuda, Kazuchika Takagaki, Natsuhisa Oka, Takeshi Wada, Tadaaki Ohgi, and Junichi Yano, Nucleic Acids Research, 2010, 38, 7845

Non-Patent Literature 2: "Practical Synthesis of Cap-4 RNA, Josef Leiter, et al., ChemBioChem 2020

Non-Patent Literature 3: "Chemical Synthesis of U1 snRNA Derivatives", Akihiro Ohkubo et al., Organic Letter, 2013

SUMMARY OF INVENTION

The aforementioned prior methods are, however, not suitable for industrial applications, due to poor stability of diphosphorylation efficiency, and difficulty in quantitative synthesis due to use of the capping enzyme. Hence, there have been demands for a technique which enables chemical introduction of the cap to the 5'-end of RNA, with a relatively simple operation.

It is therefore an object of the present invention to provide a method for producing capped RNA, capable of chemically introducing the cap structure into RNA with a simple operation.

The present inventors have intensively studied to solve the problems. The present inventors have consequently found that a cap structure can be chemically introduced at the 5'-end of RNA, by using an activated capping compound obtained by activating a diphosphate compound having a cap structure with imidazole, and by reacting the capping compound with monophosphate RNA under predetermined conditions, and have arrived at the present invention.

That is, a method for producing a capped RNA which is an RNA having the 5'-end modified with a cap, the method including: reacting an activated capping compound represented by formula (1) below, with a monophosphate RNA having the 5'-end monophosphorylated:

{Chemical Formula 1}

(1)

where, L represents a leaving group.

In this case, the activated capping compound is preferably a compound represented by formula (2) below.

[Chemical Formula 2]

(2)

The activated capping compound and the monophosphate RNA are preferably reacted in the presence of a heteroaromatic compound, a metal salt, and a solvent.

In this case, the metal salt is preferably a calcium salt.

Furthermore in this case, a reaction temperature is preferably within the range from 30 to 60° C.

Furthermore in this case, a reaction time is preferably within the range from 1 to 25 hours.

Furthermore in this case, the solvent is preferably an organic solvent that contains 0 to 20% by weight of water.

Furthermore in this case, a concentration of the activated capping compound is preferably in the range from 5 to 30 mM.

Furthermore in this case, the heteroaromatic compound is preferably 2-nitroimidazole and/or 1-methylimidazole.

The present invention enables chemical introduction of the cap structure into RNA, with a simple operation.

DESCRIPTION OF THE INVENTION

Figure 1:
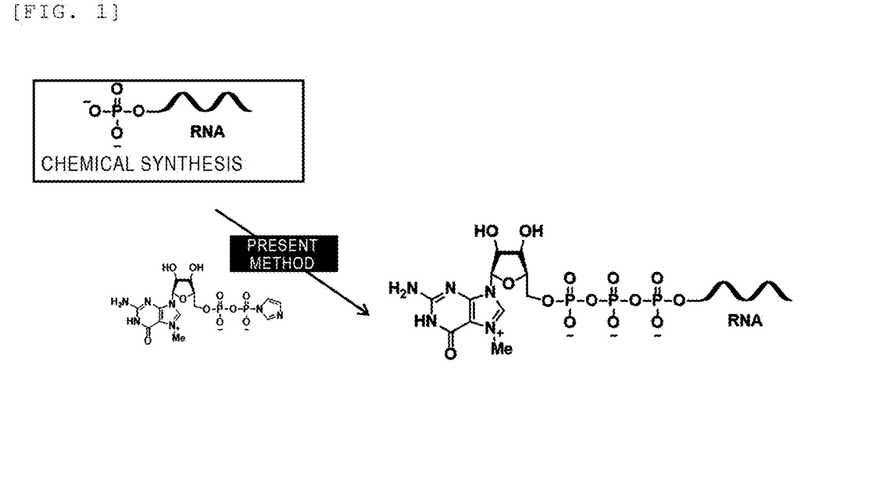
FIG. 1 is a drawing that illustrates an outline of a method for producing a capped RNA of the present invention.

The method for producing a capped RNA of the present invention will be explained below. The method for producing a capped RNA of the present invention is a method for introducing a cap at the 5'-end of an RNA molecule such as mRNA, that is, a method for producing a capped RNA which is modified at the 5'-end with a cap. FIG. 1 is a drawing that illustrates an outline of the method for producing a capped RNA of the present invention.

In the method of the present invention, first, an activated capping compound represented by formula (1) below, and a monophosphate RNA having the 5'-end monophosphorylated, are prepared,

[Chemical Formula 3]

(1)

where, L represents a leaving group.

The activated capping compound represented by formula (1) is preferably a compound represented by formula (2) below. The activated capping compound represented by formula (2) below is a compound obtained by activating a diphosphate compound having a cap structure, with imidazole as a leaving group L, that is, a compound in which imidazole is bound to 7-methylguanosine diphosphate.

[Chemical Formula 4]

(2)

The leaving group L in formula (1), besides the imidazole group, is exemplified by heteroaromatic ring compounds such as pyrazoles, oxazoles, thiazoles, pyridines, pyrimidines, pyrazines, and triazines.

The activated capping compound represented by Formula (2) may be synthesized by a method of diphosphorylation of guanosine, followed by dehydration condensation with imidazole. More specifically, the synthesis may follow a scheme described later in EXAMPLES. In summary, the 5'-position of a ribose of guanosine is oxidized to synthesize guanosine monophosphate (guanosine-5'-phosphate), to which imidazole is then reacted, thereby bonding imidazole to the phosphate group. Next, the product is reacted typically with triethanolamine phosphate to synthesize guanosine diphosphate, and further typically with iodomethane to methylate the 7-position of the base. Lastly, the product is reacted with imidazole, to bond the imidazole to the phosphate group.

The monophosphate RNA having the 5'-end monophosphorylated is a target compound to which the activated capping compound can bind. The 5'-monophosphate RNA may be synthesized typically by a method of removing pyrophosphate from 5'-triphosphate RNA with use of RNA 5'-pyrophosphohydrolase (RppH), or by a chemical solid phase synthesis method. A counter salt of monophosphate RNA is exemplified by tetraalkylammonium salt, trialkyl acetate salt, and sodium acetate salt. In particular, use of an organic salt as a counter cation of phosphoric acid can improve the reactivity.

Next, the activated capping compound and the monophosphate RNA are reacted, in the presence of the heteroaromatic compound; at least one metal salt selected from the group consisting of calcium salt, zinc salt, magnesium salt, nickel salt, and copper salt; and the solvent.

The heteroaromatic compound is preferably an imidazole compound having an imidazole group. The imidazole compound is exemplified by N-alkylimidazole in which an alkyl group is bound to nitrogen of imidazole, wherein the alkyl group is particularly exemplified by those having the alkyl group with 1 to 5 carbon atoms. The N-alkylimidazole is exemplified by 1-methylimidazole, 1-ethylimidazole, 1-propylimidazole, 4-methylimidazole, 1-methyl-1H-imidazole-2-carboxylate, 1-methylimidazole-4-carboxylate, 5-chloro-1-methyl-4-nitroimidazole, and 2-hydroxymethyl-1-methylimidazole. Among these N-alkylimidazoles, preferred is 1-methylimidazole for its high activity of cap introduction. The imidazole compound is also exemplified by imidazoles other than N-alkylimidazole, which include 1-(2-hydroxyethyl)imidazole and 2-nitroimidazole. Among these imidazole compounds, preferred is 2-methylimidazole for its high activity of cap introduction.

The metal salt is selectable from the group consisting of calcium salt, zinc salt, magnesium salt, nickel salt, and copper salt, or may be mixture of these salts (calcium and zinc salts, for example). The calcium salt is exemplified by calcium chloride ($CaCl_2$) and calcium hydroxide ($Ca(OH)_2$). The zinc salt is exemplified by zinc chloride ($ZnCl_2$). Among them, preferred is $CaCl_2$ for its high activity of cap introduction.

The solvent is exemplified by water and an organic solvent. The organic solvent is exemplified by dimethyl sulfoxide (DMSO), acetone, acetonitrile, tetrahydrofuran (THF), dioxane, methyl ethyl ketone, N,N-dimethylformamide (DMF), 1-methyl-2-pyrrolidone (NMP), dimethylformamide (DMF), methanol, and ethanol. Among them, preferred is dimethyl sulfoxide (DMSO) for its high ability of solubilizing organic salts. With use of the organic solvent as the main solvent, the capping reaction can proceed very efficiently, while suppressing a side reaction causing hydrolysis of the capping reagent. The solvent is preferably organic solvent that contains 0 to 20 wt % of water, and more preferably contains 1 to 10 wt % of water, in consideration of high activity of cap introduction.

Concentration of the activated capping compound in the reaction liquid preferably falls within the range from 5 to 30 mM. Concentration of the heteroaromatic compound in the reaction liquid is preferably in the range from 0.5 to 20 mM, more preferably from 5 to 15 mM, and particularly preferably 10 mM. Concentration of the metal salt in the reaction liquid is preferably in the range of 0.5 to 10 mM. The reaction conditions may be suitably set, typically with the reaction temperature adjusted within the range from 30 to 60° C., preferably from 35 to 40° C., and particularly preferably at 37° C. The reaction time is within the range from 1 to 25 hours, preferably from 5 to 15 hours, and particularly preferably 9 hours. Cap introduction activity is kept high within these conditions, enabling efficient introduction of the cap structure into mRNA.

EXAMPLES

The present invention will now be specifically described with reference to Examples, without limiting the object of the present invention. In Examples below, notation of "%" is on the mass basis (mass percent) unless otherwise specifically noted.

An activated capping compound (Compound 13) was synthesized according to a scheme below. The percentages in the drawing denote yields.

[Chemical Formula 5]

(1) Synthesis of Compound 9

Guanosine (748 mg, 2.64 mmol, 1.0 eq.) was suspended in trimethyl phosphate (7.0 mL). While stirring the suspension at −10° C., phosphonyl chloride (743 µL, 7.92 mmol, 3.0 eq.) was added dropwise, and the mixture was stirred at −10° C. for 20 hours. A 1 M TBAE Buffer was added to quench the reaction. After condensing the solution, the product was purified with DEAE-sephadax. A fraction was collected and condensed, to obtain a white solid (TEA salt).

(2) Synthesis of Compound 10

Compound 9 (1.63 g, 4.48 mmol, 1.0 eq. TEA salt), imidazole (3.67 g, 53.9 mmol, 12 eq.), and 2,2'-dithiodipyridine (3.30 g, 14.9 mmol, 3.3 eq.) were dissolved in anhydrous DMSO (10 mL), to which TEA (1.90 mL, 13.5 mmol, 3.0 eq) and $Ph_3P$ (3.74 g, 14.2 mmol, 3.2 eq) were added, and the mixture was stirred at room temperature for 18 hours. Sodium perchlorate (2.04 g, 16.6 mmol, 3.7 eq.) dissolved in dry acetone (80 mL) was added, and the mixture was allowed to stand at 4° C. A precipitated solid was collected by suction filtration, and washed with cold dry acetone. The obtained solid was dried under vacuum, to obtain a white powder (Na salt).

(3) Synthesis of Compound 11

Compound 10 (500 mg, 1.21 mmol, 1.0 eq.) was suspended in anhydrous DMSO (8.0 mL). The suspension was kept stirred at room temperature, to which zinc chloride (849 mg, 6.23 mmol, 5.1 eq.) and triethylamine phosphate (1.0 g, 5.02 mmol, 4.1 eq., anhydrous DMSO aq.) were added, and the mixture was stirred at room temperature for 16 hours. A 1 M TBAE Buffer was added to quench the reaction. The resultant precipitate was removed by suction filtration, and the solution was condensed. The condensate was purified with DEAE-sephadax. A fraction was collected and condensed, to obtain a white solid (TEA salt).

(4) Synthesis of Compound 12

Compound 11 (100 mg, 0.226 mmol, 1.0 eq. TEA salt) was dissolved in anhydrous DMSO (3.0 mL). Methyl iodide (90 µL, 1.42 mmol, 6.3 eq.) was added thereto at room temperature, and the mixture was stirred for 18 hours. A 1 M TBAE Buffer was added to quench the reaction. The mixture was fractionated with use of diethyl ether, and the aqueous phase was collected and condensed. The condensate was purified with DEAE-sephadax. A fraction was collected and condensed, to obtain a white solid (TEA salt).

(5) Synthesis of Compound 13

Compound 12 (20 mg, 43.7 µmol, 1.0 eq. TEA salt), imidazole (46.6 g, 0.685 mmol, 15 eq.), and 2,2'-dithiodipyridine (61.3 mg, 0.685 mmol, 6.0 eq.) were dissolved in anhydrous DMSO (400 µL), to which TEA (18.0 µL, 0.129 mmol, 3.0 eq), and $Ph_3P$ (57.7 mg, 0.220 mmol, 5.0 eq) were added, and the mixture was stirred at room temperature for 4.0 hours. Sodium perchlorate (68.2 mg, 0.606 mmol, 14 eq.) dissolved in dry acetone (3.6 mL) was added, and the mixture was allowed to stand at 4° C. A precipitated solid was collected by suction filtration, and washed with cold dry acetone. The obtained solid was dried under vacuum, to obtain a white powder (Na salt).

The production conditions are as follows.
Column:
DEAE Sephadax
Eluent:
A) MQ
B) 1.5 M TEAB Buffer+10% ACN
Gradient:
0 to 10 min, B conc. 0%
10 to 210 min, B conc. 0 to 100%
210 to 240 min, B conc. 100%
240 min, B conc. 0%
Flow rate:
5 ml/min
Detection:
260 nm

1. Experimental Case 1 (Example 1): Examination of Temperature Conditions

Room temperature, 37° C. (Example 1-1), and 55° C. (Example 1-2) were examined.

(1) Experiment

Figure 2A:
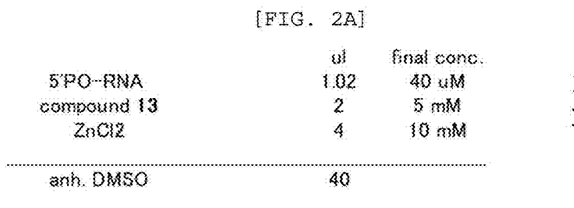
FIGS. 2A-2C are charts that illustrate results of Experimental Case 1 in EXAMPLES.
Figure 2B:
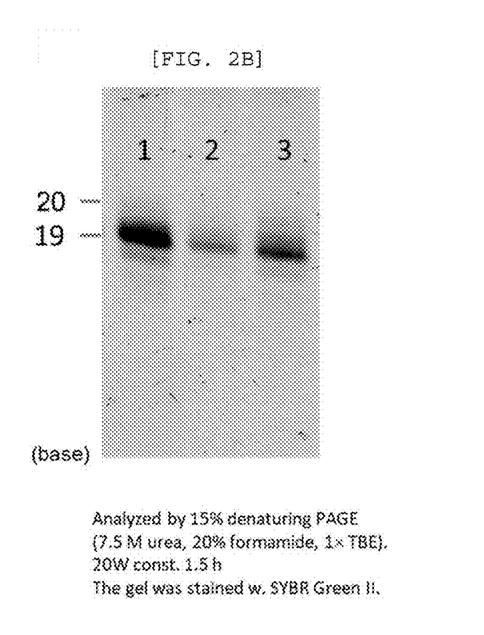
Figure 2C:
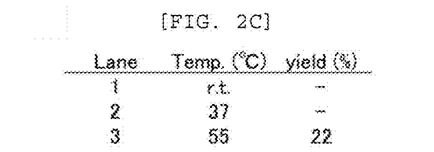

Necessary amounts of RNA, the activated capping compound, and $CaCl_2$ were mixed. This solution was evaporated to dryness, with use of a centrifugal evaporator. Anh. DMSO was added, and the mixture was incubated overnight at room temperature (r.t.), 37° C. or 55° C. The mixture was desalted with use of Amicon (3K), and the reaction was quenched. The reaction efficiency was determined by gel electrophoresis. The results are illustrated in FIGS. 2A-2C. FIG. 2A summarizes the concentrations of the individual components in the reaction liquid, FIG. 2B illustrates results of electrophoresis, and FIG. 2C summarizes the yields.

(2) Results

The reaction was not found to proceed at r.t. and 37° C. The reaction was found to proceed at 55° C., only with low efficiency. The activated monophosphate was found to improve the reaction efficiency by approximately 20% at 55° C.

2. Experimental Case 2 (Example 2): Examination of $MCl_2$

Six metal salts, that is, $NiCl_2$ (Reference Example 2-1), $ZnCl_2$ (Reference Example 2-2), $CaCl_2$, (Example 2-1), $MgCl_2$ (Example 2-2), $CuCl_2$, (Reference Example 2-3), and $FeCl_2$ (Reference Example 2-4) were examined, as a Lewis acid.

(1) Experiment

Figure 3A:
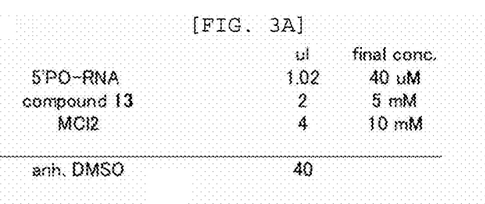
FIGS. 3A-3C are charts that illustrate results of Experimental Case 2 in EXAMPLES.
Figure 3B:
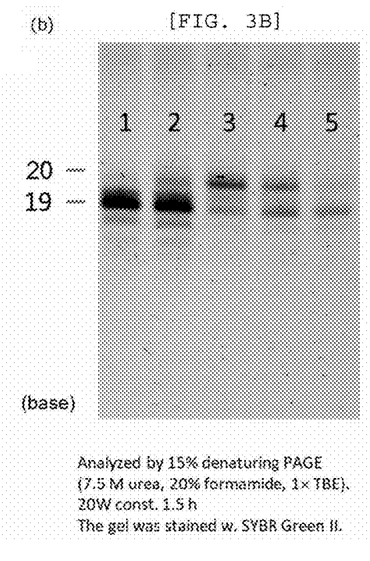
Figure 3C:
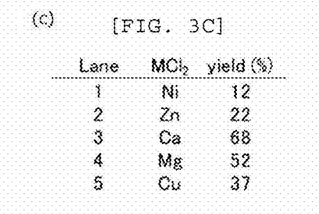

Necessary amounts of RNA, the activated capping compound, and $MCl_2$ were mixed. This solution was evaporated to dryness, with use of a centrifugal evaporator. Anh. DMSO was added, and the mixture was incubated at 55° C. for 17 hours. The mixture was desalted with use of Amicon (3K), and the reaction was quenched. The reaction efficiency was determined by gel electrophoresis. The results are illustrated in FIGS. 3A-3C. FIG. 3A summarizes the concentrations of the individual components in the reaction liquid, FIG. 3B illustrates results of electrophoresis, and FIG. 3C summarizes the yields.

(2) Results

The reaction efficiency was found to improve with use of $CaCl_2$) (Example 2-1) and $MgCl_2$ (Example 2-2).

3. Experimental Case 3 (Example 3): Examination of

Addition of 1-Methylimidazole and Reaction Time
1-Methylimidazole was added to the cases with $ZnCl_2$ and $CaCl_2$) to examine the reaction.

(1) Experiment

Figure 4A:
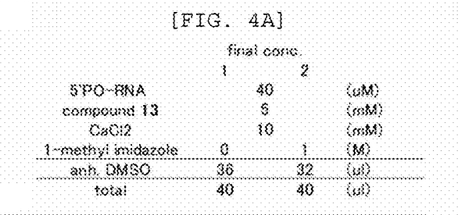
FIGS. 4A-4D are charts that illustrate results of Experimental Case 3 in EXAMPLES.
Figure 4B:
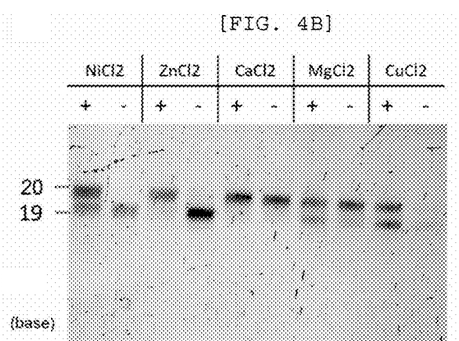
Figure 4C:
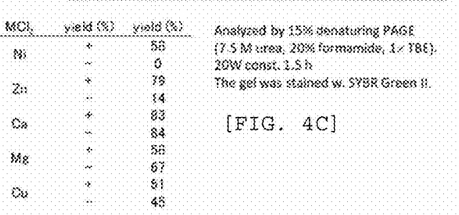
Figure 4D:
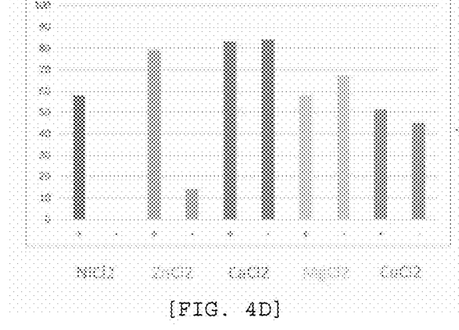

Necessary amounts of RNA, the activated capping compound, and $MCl_2$ were mixed. This solution was evaporated to dryness, with use of a centrifugal evaporator. 1-Methylimidazole and anh. DMSO were added, and the mixture was incubated at 55° C. for 17 hours. The mixture was desalted with use of Amicon (3K), and the reaction was quenched. The reaction efficiency was determined by gel electrophoresis. The results are illustrated in FIGS. 4A-4D. FIG. 4A summarizes the concentrations of the individual components in the reaction liquid, FIG. 4B illustrates results of electrophoresis, FIG. 4C summarizes the yields, and FIG. 4D illustrates a graph of the yields.

(2) Results

Addition of 1-methylimidazole was found to improve the yield as a whole, regardless of the type of salt.

4. Experimental Case 4 (Example 4): Examination of Concentration of 1-Methylimidazole Since the reaction efficiency was found to improve as a result of addition of 1-methylimidazole, the concentration conditions were examined.

(1) Experiment

Figures 5A, 5B, 5C:
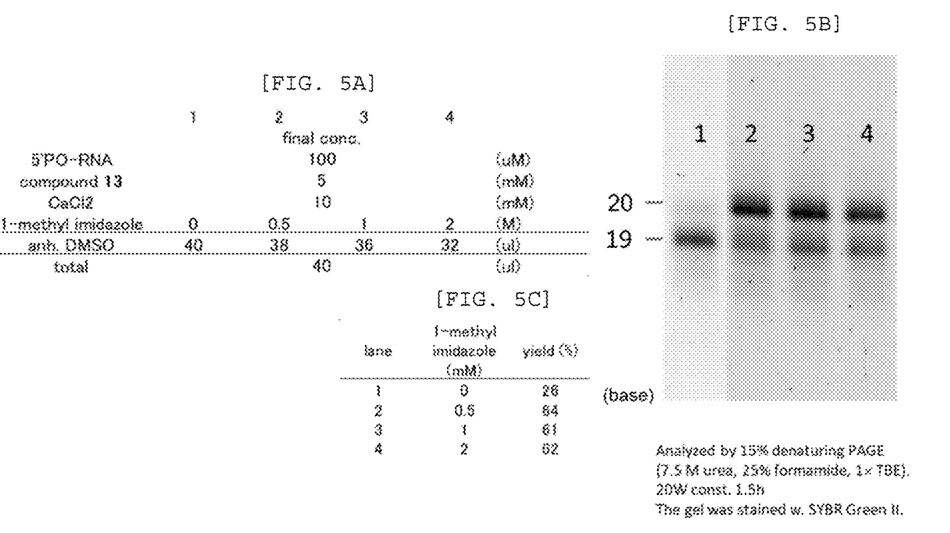
FIGS. 5A-5C are charts that illustrate results of Experimental Case 4 in EXAMPLES.

Necessary amounts of RNA, the activated capping compound, and $CaCl_2$ were mixed. This solution was evaporated to dryness, with use of a centrifugal evaporator. Necessary amounts of 1-methylimidazole and anh. DMSO (anhydrous dimethyl sulfoxide) were added, and the mixture was incubated at 55° C. for 3 hours. The mixture was desalted with use of Amicon (3K), and the reaction was quenched. The reaction efficiency was determined by gel electrophoresis. The results are illustrated in FIGS. 5A-5C. FIG. 5A summarizes the concentrations of the individual components in the reaction liquid, FIG. 5B illustrates results of electrophoresis, and FIG. 5C summarizes the yields.

(2) Results

Changes in the concentration were found not to affect the reaction efficiency.

5. Experimental Case 5 (Example 5): Examination of Concentration of Nucleic Acid Whether the concentration of nucleic acid concentration would affect the reaction efficiency or not was examined.

(1) Experiment

Figure 6A:
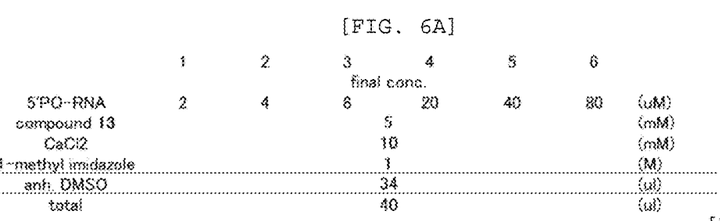
FIGS. 6A-6C are charts that illustrate results of Experimental Case 5 in EXAMPLES.
Figures 6B, 6C:
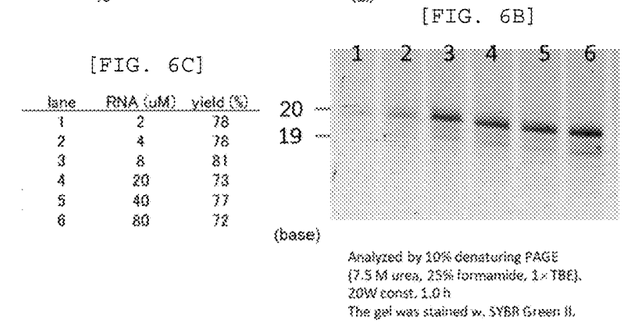

Necessary amounts of RNA, the activated capping compound, and $CaCl_2$ were mixed. This solution was evaporated to dryness, with use of a centrifugal evaporator. 1-Methylimidazole and anh. DMSO were added, and the mixture was incubated at 55° C. for 3 hours. The mixture was desalted with use of Amicon (3K), and the reaction was quenched. The reaction efficiency was determined by gel electrophoresis. The results are illustrated in FIGS. 6A-6C. FIG. 6A summarizes the concentrations of the individual components in the reaction liquid, FIG. 6B illustrates results of electrophoresis, and FIG. 6C summarizes the yields.

(2) Results

Changes in the concentration of nucleic acid were found to not so largely affect the reaction efficiency.

6. Experimental Case 6 (Example 6): Examination in Presence of Water

The reaction efficiency in the presence of water was examined.

(1) Experiment (Lane 1 (Example 6-1) and Lane 2 (Example 6-2))

Necessary amounts of RNA, the activated capping compound, and $CaCl_2$ were mixed. This solution was evaporated to dryness, with use of a centrifugal evaporator. Necessary amounts of 1-methylimidazole and the individual solvents (anh. DMSO/MQ (ultrapure water)=1/1 or anh. DMSO) were added, and the mixtures were incubated at 55° C. for 3 hours. The mixture was desalted with use of Amicon (3K), and the reaction was quenched. The reaction efficiency was determined by gel electrophoresis.

(2) Experimental Case (Lane 3 (Example 6-3))

Figure 7A:
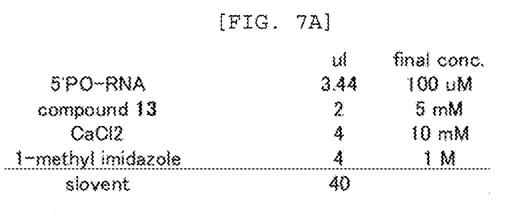
FIGS. 7A-7C are charts that illustrate results of Experimental Case 6 in EXAMPLES.
Figure 7B:
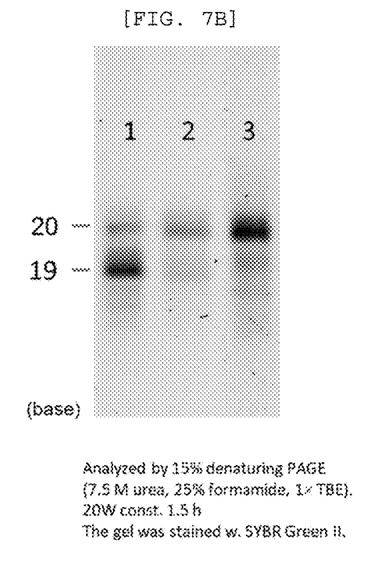
Figure 7C:
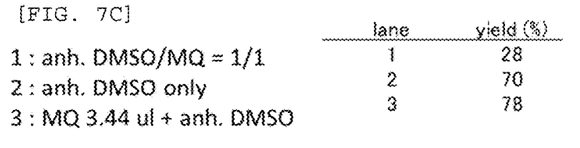

Necessary amounts of the activated capping compound and $CaCl_2$ were mixed. This solution was evaporated to dryness, with use of a centrifugal evaporator. Necessary amounts of 1-methylimidazole, anh. DMSO, and RNA were added, and the mixture was incubated at 55° C. for 3 hours. The mixture was desalted with use of Amicon (3K), and the reaction was quenched. The reaction efficiency was determined by gel electrophoresis. The results are illustrated in FIGS. 7A-7C. In this figure, FIG. 7A summarizes the concentrations of the individual components in the reaction liquid, FIG. 7B illustrates results of electrophoresis, and FIG. 7C summarizes the yields.

(3) Results

From comparison between Lane 2 as a positive control with other lanes, the reaction efficiency was found to largely decrease under the condition with 50% MQ (Lane 1), meanwhile the reaction efficiency was slightly increased under the condition with approximately 10% MQ (Lane 3).

7. Experimental Case 7 (Example 7): Examination of Concentration of $CaCl_2$)

Whether the concentration of salt would affect the reaction efficiency or not was examined.

(1) Experiment

Figure 8A:
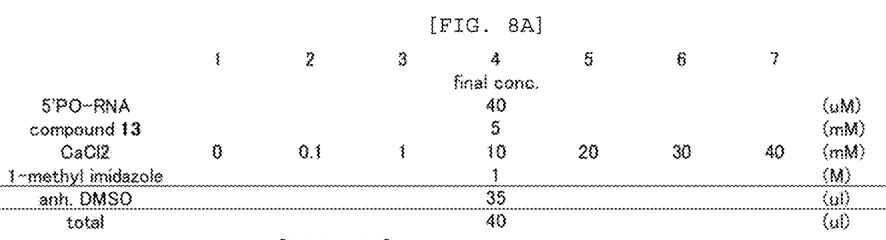
FIGS. 8A-8C are charts that illustrate results of Experimental Case 7 in EXAMPLES.
Figure 8B:
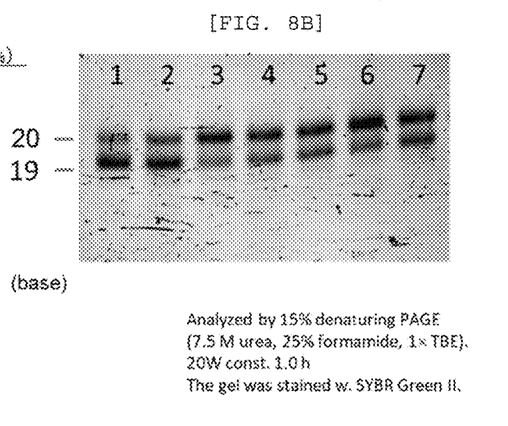
Figure 8C:
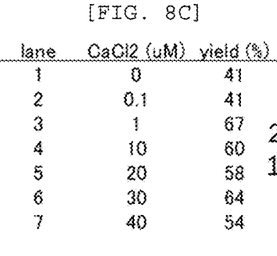

Necessary amounts of the activated capping compound and $CaCl_2$ were mixed. This solution was evaporated to dryness, with use of a centrifugal evaporator. Necessary amounts of 1-methylimidazole, anh. DMSO, and RNA were added, and the mixture was incubated at 55° C. for 3 hours. The mixture was desalted with use of Amicon (3K), and the reaction was quenched. The reaction efficiency was determined by gel electrophoresis. The results are illustrated in FIGS. 8A-8C. In this figure, FIG. 8A summarizes the concentrations of the individual components in the reaction liquid, FIG. 8B illustrates results of electrophoresis, and FIG. 8C summarizes the yields.

(2) Results

The results taught that a certain level of salt concentration would be necessary for highly efficient reaction, but high concentration would degrade the efficiency.

8. Experimental Case 8 (Example 8): Examination of Concentration of Activated Capping Compound Whether the concentration of the activated capping compound would affect the reaction efficiency or not was examined.

(1) Experiment

Figure 9A:
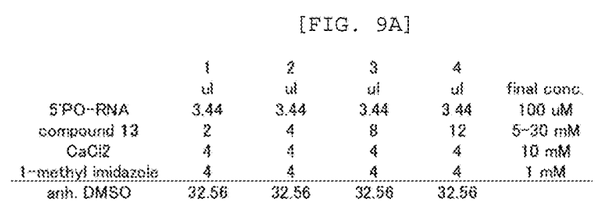
FIGS. 9A-9C are charts that illustrate results of Experimental Case 8 in EXAMPLES.
Figure 9B:
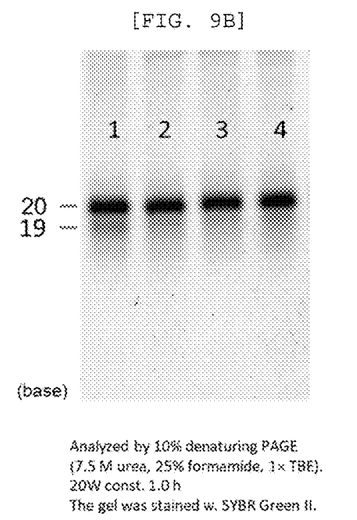
Figure 9C:
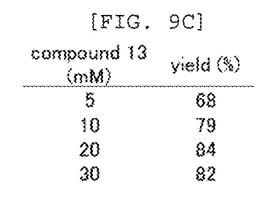

Necessary amounts of the activated capping compound and $CaCl_2$ were mixed. This solution was evaporated to dryness, with use of a centrifugal evaporator. Necessary amounts of 1-methylimidazole, anh. DMSO, and RNA were added, and the mixture was incubated at 55° C. for 3 hours. The mixture was desalted with use of Amicon (3K), and the reaction was quenched. The reaction efficiency was determined by gel electrophoresis. The results are illustrated in FIGS. 9A-9C. In this figure, FIG. 9A summarizes the concentrations of the individual components in the reaction liquid, FIG. 9B illustrates results of electrophoresis, and FIG. 9C summarizes the yields.

(2) Results

As the concentration increased, the reaction efficiency improved, with a best case (20 mM) demonstrating a yield of 84%.

9. Experimental Case 9 (Example 9): Examination of Reagent to be Added Last

Dependence of the reaction efficiency on the type of reagent to be added last, under the conditions described in "6. Experimental Case 6 (Example 6): Examination in Presence of Water", was examined. The reagent added last was 5'-PO RNA in Lane 1, the activated capping compound in Lane 2, and $CaCl_2$) in Lane 3.

(1) Experiment

Figure 10A:
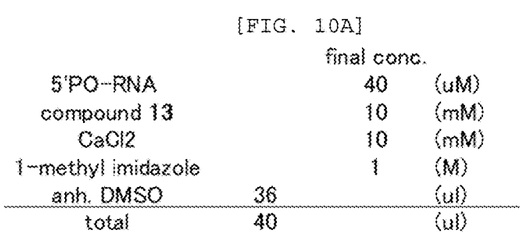
FIGS. 10A-10C are charts that illustrate results of Experimental Case 9 in EXAMPLES.
Figure 10B:
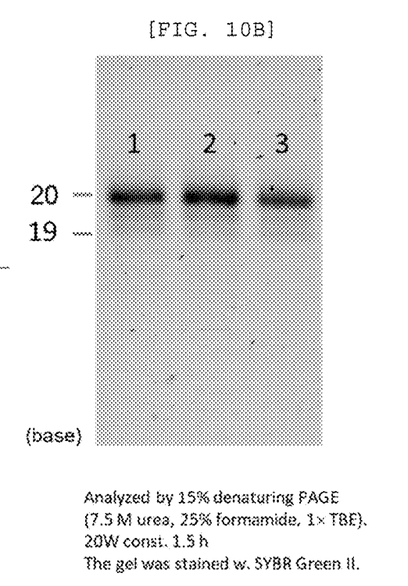
Figure 10C:
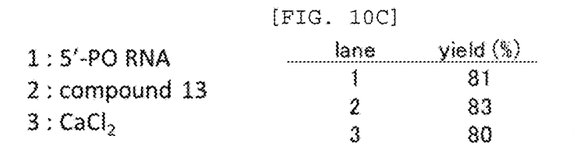

Necessary amounts of the activated capping compound and $CaCl_2$) (Lane 1); RNA and $CaCl_2$) (Lane 2); and RNA and the activated capping compound (Lane 3) were respectively mixed. This solution was evaporated to dryness, with use of a centrifugal evaporator. Necessary amounts of 1-methylimidazole, anh. DMSO, RNA (Lane 1), the activated capping compound (Lane 2), and $CaCl_2$ (Lane 3) were respectively added, and each mixture was incubated at 55° C. for 3 hours. The mixture was desalted with use of Amicon (3K), and the reaction was quenched. The reaction efficiency was determined by gel electrophoresis. The results are illustrated in FIGS. 10A-10C. FIG. 10A summarizes the concentrations of the individual components in the reaction liquid, FIG. 10B illustrates results of electrophoresis, and FIG. 10C summarizes the yields.

(2) Results

The reaction efficiency was not found to be largely affected, whichever reagent was added last.

10. Experimental Case 10 (Example 10): Examination of Reaction Time

The reaction liquid was sampled at each of 1.0, 2.0, 3.0, 4.0, 5.0, 6.0, and 20 hours after the start of reaction, and changes in the yield depending on the reaction time were examined. The reaction condition involved incubation at 55° C. For a case of 1-methylimidazole (+) in which the reaction almost completed within one hour, the reaction liquid was sampled in shorter time intervals (at 10, 20, 30, 40, 50, 60, 90 and 120 min after) to examine difference in the reaction efficiency.

(1) Experiment

Figure 11A:
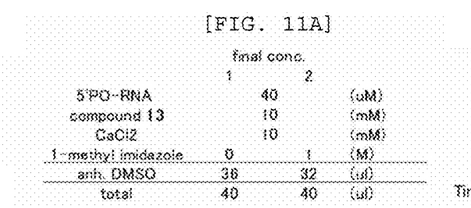
FIGS. 11A-11C are charts that illustrate results of Experimental Case 10 in EXAMPLES.
Figure 11B:
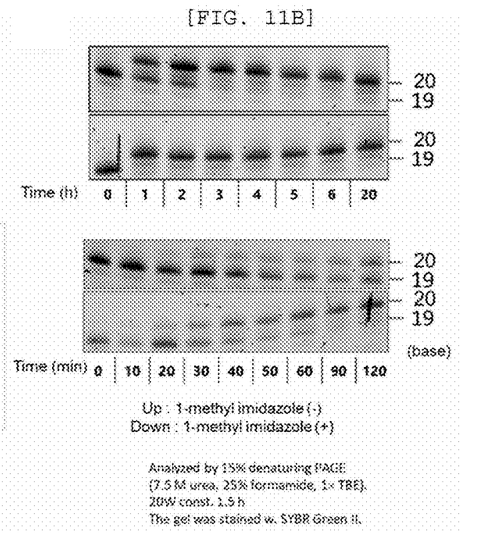
Figure 11C:
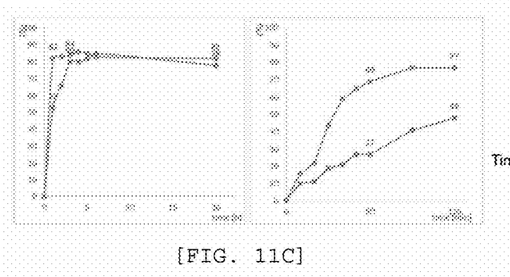

Necessary amounts of RNA and $CaCl_2$ were mixed. This solution was evaporated to dryness, with use of a centrifugal evaporator. Necessary amounts of 1-methylimidazole (for "+" only), anh. DMSO, and the activated capping compound were added, and the mixture was incubated at 55° C. The mixture was desalted with use of Amicon (3K), and the reaction was quenched. The reaction efficiency was determined by gel electrophoresis. The results are illustrated in FIGS. 11A-11C. FIG. 11A summarizes the concentrations of the individual components in the reaction liquid, FIG. 11B illustrates results of electrophoresis, and FIG. 11C summarizes the yields.

(2) Results

The reaction was found to almost complete within 2 to 3 hours, demonstrating a slight increase of the yield after an overnight reaction. The case of 1-methylimidazole (−) demonstrated large differences in the reaction rate.

11. Experimental Case 11 (Example 11): Examination of Reaction in Aqueous Solution The reaction in an aqueous solution was examined with use of $CaCl_2$ and $MgCl_2$, which demonstrated high yields in "3. Experimental Case 3 (Example 3): Examination of Addition of 1-Methylimidazole and Reaction Time", without needing an activator. MQ and 10 mM HEPES Buffer (pH=7.4) were used as the solvent. The reaction condition involved overnight incubation at 55° C.

(1) Experiment

Figures 12A, 12B, 12C:
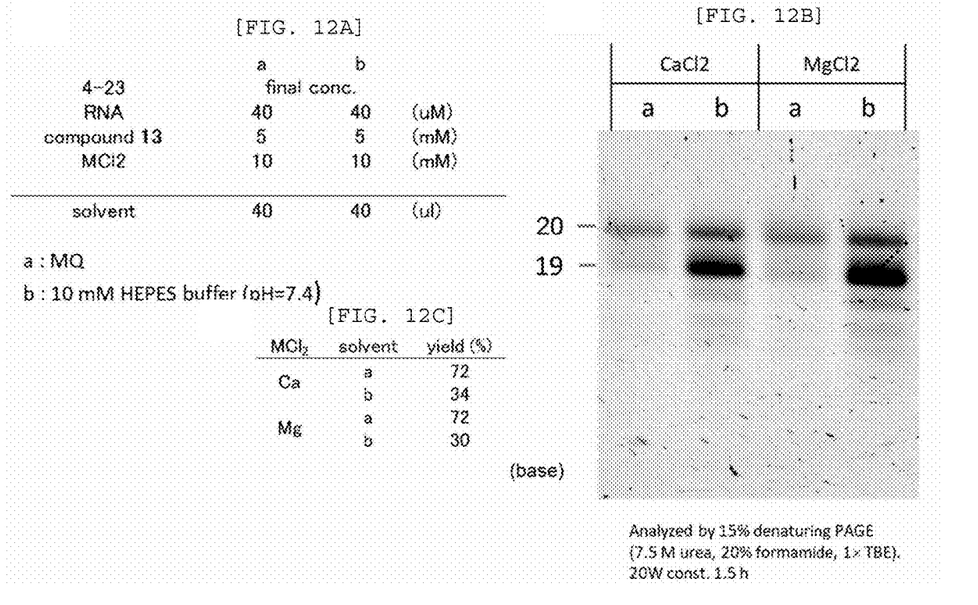
FIGS. 12A-12C are charts that illustrate results of Experimental Case 11 in EXAMPLES.

Necessary amounts of RNA, the activated capping compound, $MCl_2$, and the solvent were mixed so as to adjust the final concentrations as summarized in the table of FIG. 12A. Each mixture was incubated overnight at 55° C. The mixture was desalted with use of Amicon (3K), and the reaction was quenched. The reaction efficiency was determined by gel electrophoresis. The results are illustrated in FIGS. 12A-12C. FIG. 12A summarizes the concentrations of the individual components in the reaction liquid, FIG. 12B illustrates results of electrophoresis, and FIG. 12C summarizes the yields.

(2) Results

It was confirmed that the reaction proceeded with high efficiency, with use of MQ as the solvent. Reduced band intensity, however, suggests that RNA was concurrently hydrolyzed.

12. Experimental Case 12 (Example 12): Examination of Salt Concentration (Mg)

Influence of $MgCl_2$ concentration in MQ solvent was examined. Four levels of concentration, varied among 5, 10, 20, and 30 mM, were examined. The reaction condition involved overnight incubation at 55° C.

(1) Experiment

Figure 13A:
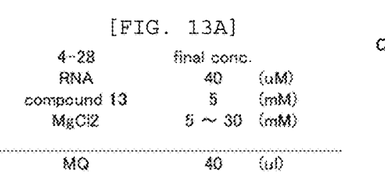
FIGS. 13A-13D are charts that illustrate results of Experimental Case 12 in EXAMPLES.
Figure 13B:
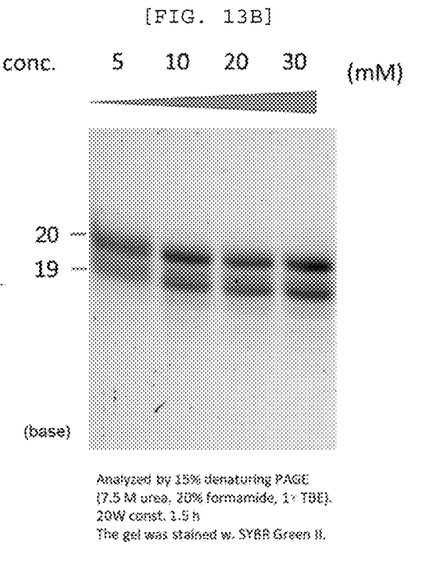
Figure 13C:
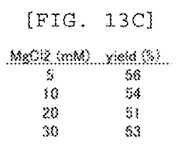
Figure 13D:
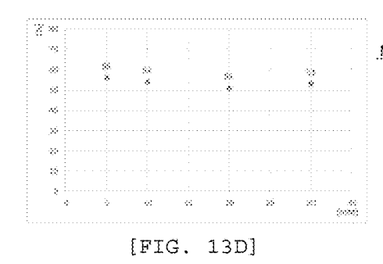

Necessary amounts of RNA, the activated capping compound, $CaCl_2$), and MQ were mixed so as to adjust the final concentrations as summarized in the table of FIG. 13A. Each mixture was incubated overnight at 55° C. The mixture was desalted with use of Amicon (3K), and the reaction was quenched. The reaction efficiency was determined by gel electrophoresis. The results are illustrated in FIGS. 13A-13D. FIG. 13A summarizes the concentrations of the individual components in the reaction liquid, FIG. 13B illustrates results of electrophoresis, FIG. 13C summarizes the yields, and FIG. 13D illustrates a graph of the yields.

(2) Results

The $MgCl_2$ concentration was not found to largely affect the reaction efficiency.

13. Experimental Case 13 (Example 13): Examination of Salt Concentration (Ca)

Influence of $CaCl_2$ concentration in MQ solvent was examined. Seven levels of concentration, varied among 5, 10, 20, 30, 45, 60, and 90 mM, were examined. The reaction condition involved overnight incubation at 55° C.

(1) Experiment

Figure 14A:
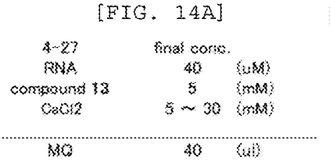
FIGS. 14A-14D are charts that illustrate results of Experimental Case 13 in EXAMPLES.
Figure 14B:
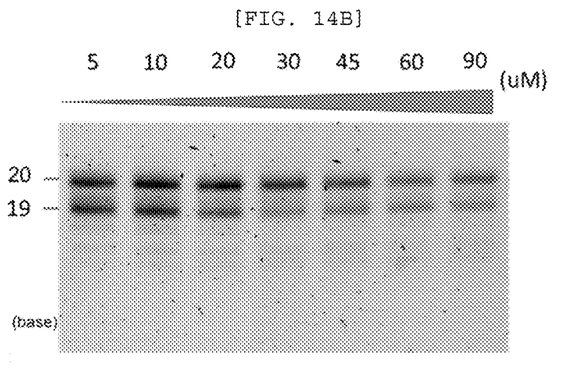
Figure 14C:
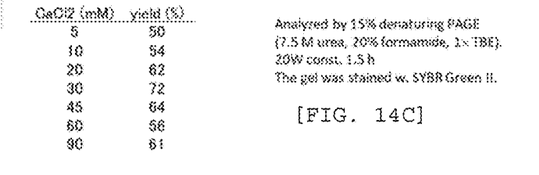
Figure 14D:
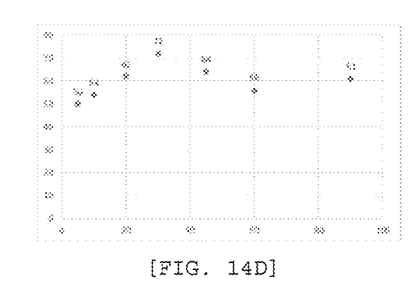

Necessary amounts of RNA, the activated capping compound, $CaCl_2$), and MQ were mixed so as to adjust the final concentrations as summarized in the table of FIG. 14A. Each mixture was incubated overnight at 55° C. The mixture was desalted with use of Amicon (3K), and the reaction was quenched. The reaction efficiency was determined by gel electrophoresis. The results are illustrated in FIGS. 14A-14D. FIG. 14A summarizes the concentrations of the individual components in the reaction liquid, FIG. 14B illustrates results of electrophoresis, FIG. 14C summarizes the yields, and FIG. 14D illustrates a graph of the yields.

(2) Results

The $CaCl_2$ concentration was found to largely affect the reaction efficiency. The yield was found to elevate as the salt concentration increased, which was peaked at 30 mM. Excessive salt concentration, however, promoted hydrolysis, degrading the reaction efficiency.

14. Experimental Case 14 (Example 14): Examination of Reaction Time

The reaction time was examined under MQ solvent conditions. The reaction liquid was sampled at each of 1.0, 2.0, 3.0, 15, 40, and 70 hours after the start of reaction, and changes in the yield depending on the reaction time were examined. The reaction condition involved incubation at 55° C.

(1) Experiment

Figure 15A:
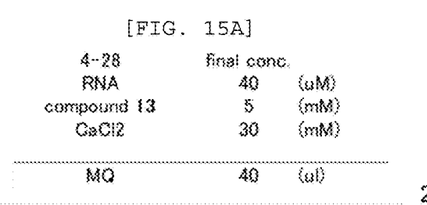
FIGS. 15A-15C are charts that illustrate results of Experimental Case 14 in EXAMPLES.
Figure 15B:
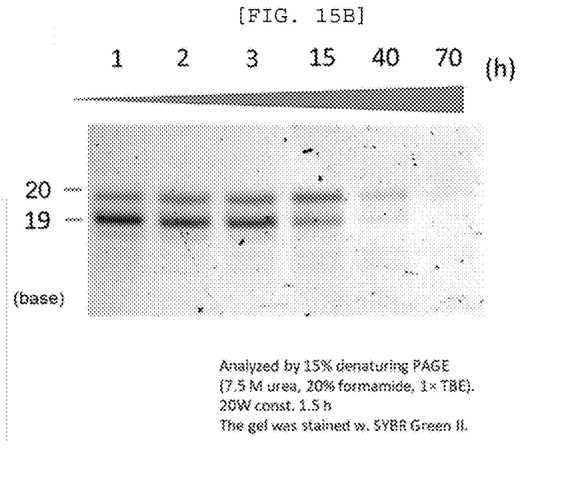
Figure 15C:
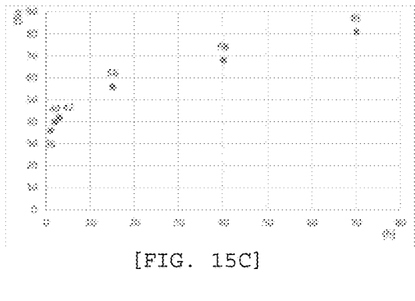

Necessary amounts of RNA, the activated capping compound, $CaCl_2$, and MQ were mixed so as to adjust the final concentrations as summarized in the table of FIG. 15A. Each mixture was incubated at 55° C. The mixture was desalted with use of Amicon (3K), and the reaction was quenched. The reaction efficiency was determined by gel electrophoresis. The results are illustrated in FIGS. 15A-15C. FIG. 15A summarizes the concentrations of the individual components in the reaction liquid, FIG. 15B illustrates results of electrophoresis, and FIG. 15C illustrates a graph of the yields.

(2) Results

Although the reaction efficiency was found to improve with time, also hydrolysis was greatly promoted, leading to decrease in the amount of RNA.

15. Experimental Case 15 (Example 15): Screening of Additives (Heteroaromatic Compounds)

A variety of imidazole derivatives, which are heteroaromatic compounds used as additives, were used for the capping reaction. The imidazole derivatives verified herein are as follows.

[Chemical Formula 4]

A

B

C

D

E

F (1) Experiment

Figure 17A:
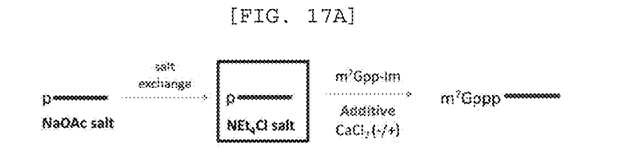
FIGS. 17A-17C are charts that illustrate results of Experimental Case 15 in EXAMPLES.
Figure 17B:
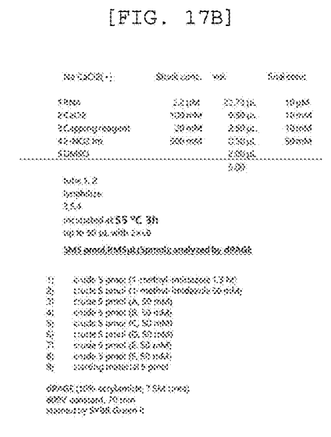

The outline of the experiment is illustrated in FIG. 17A.

[Ion Exchange]

A cation exchange resin column (Dowex 50Wx8) was equilibrated by passing therethrough a 20% (v/w) a tetraethylammonium chloride solution, and washed with MQ, to which a solution of RNA precipitated from isopropanol was loaded, and eluted with MQ. A fraction showing absorbance A260 was collected, to obtain an RNA solution whose salt form was exchanged to tetraethylammonium chloride.

[Capping Reaction]

Ion-exchanged RNA solution (and $CaCl_2$ solution) was placed in an Eppendorf tube, and water was removed with a lyophilizer. m[7]Gpp-Im (activated capping compound), an imidazole derivative solution in DMSO, and DMSO for concentration adjustment were added. Final concentrations were adjusted to 10 µM for RNA, 10 mM for $CaCl_2$, 10 mM for m[7]Gpp-Im, and 50 mM for imidazole derivative.

Figure 17C:
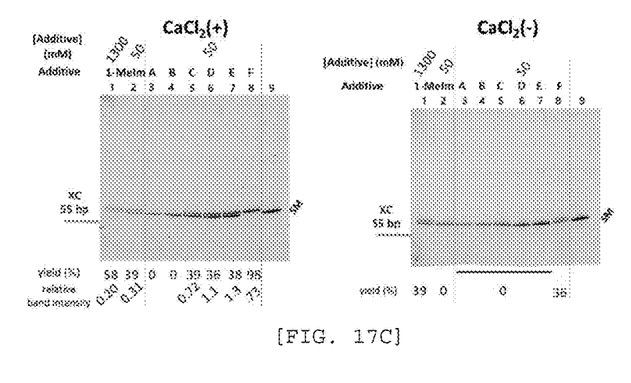

The reaction liquid was incubated at 55° C. for 3 hours, a part of the reaction liquid was then mixed with 2× loading buffer (80% formamide and 10 mM EDTA in MQ), and analyzed by gel electrophoresis (10% acrylamide, 7.5 M urea). Results of the electrophoresis are illustrated in FIG. 17C.

(2) Results

The results taught that 2-nitroimidazole (Compound F) demonstrated the highest yield (yield=98%) in the presence of CaCl$_2$ (+). 2-Nitroimidazole was thus found to be optimal as the additive.

16. Experimental Case 16 (Example 16): Screening of Additive Concentration, Temperature and Reaction Time With use of 2-nitroimidazole as the additive, the CAP reaction was conducted at various concentrations, reaction temperatures, and reaction times. The reaction conditions are as summarized in FIG. 18B.

(1) Experiment

Figure 18A:
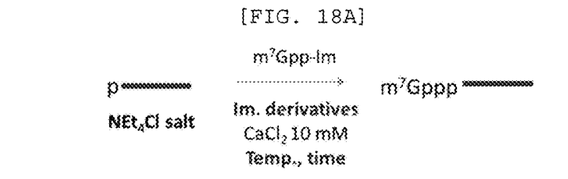
FIGS. 18A-18C are charts that illustrate results of Experimental Case 16 in EXAMPLES.
Figure 18B:
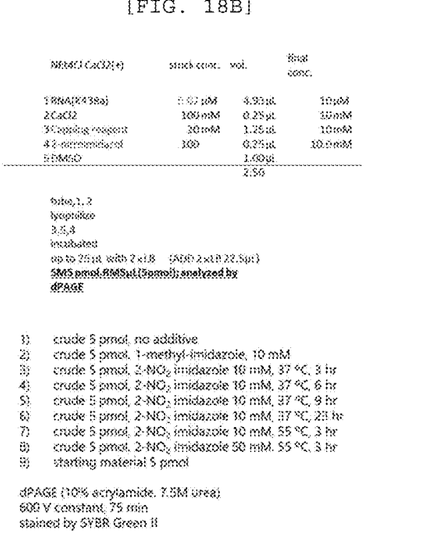

The outline of the experiment is illustrated in FIG. 18A.

[Capping Reaction]

Ion-exchanged RNA solution and CaCl$_2$ solution were placed in an Eppendorf tube, and water was removed with a lyophilizer. m7Gpp-Im, an imidazole derivative solution in DMSO, and DMSO for concentration adjustment were added.

Final concentrations were adjusted to 10 µM for RNA, 10 mM for CaCl$_2$, 10 mM for m$^7$Gpp-Im, and 0 to 50 mM for the imidazole derivative.

Figure 18C:
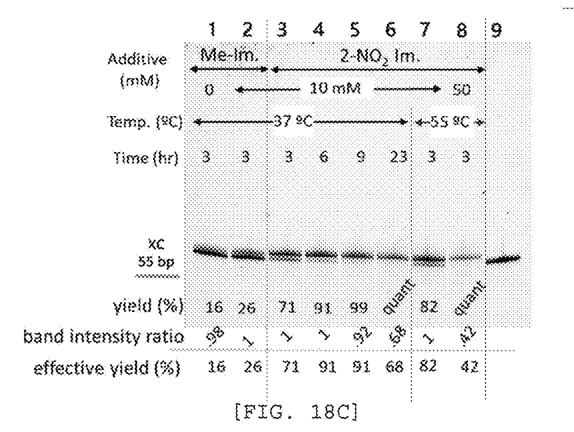

The reaction liquid was incubated at the individual temperatures (37 or 55° C.) for 3 to 23 hours, a part of the reaction liquid was then mixed with 2× loading buffer, and analyzed by gel electrophoresis (10% acrylamide, 7.5 M urea). Results of the electrophoresis are illustrated in FIG. 18C.

(2) Results

The results taught that the conditions of Lane 5 (concentration: 10 mM, reaction temperature: 37° C., reaction time: 9 hours) were optimal.

17. Experimental Case 17 (Example 17): Evaluation of Effect of Counter Salt for RNA The capping reaction was conducted with use of several salts as a counter salt for RNA. The salts evaluated herein are denoted typically as K440'A in FIG. 19B.

(1) Experiment

Figure 19A:
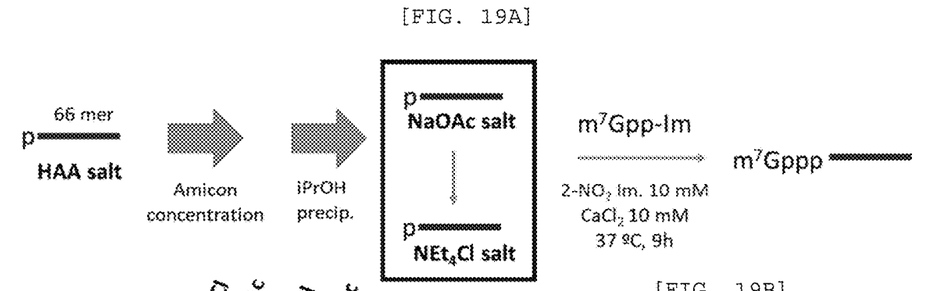
FIGS. 19A-19C are charts that illustrate results of Experimental Case 17 in EXAMPLES.
Figure 19B:
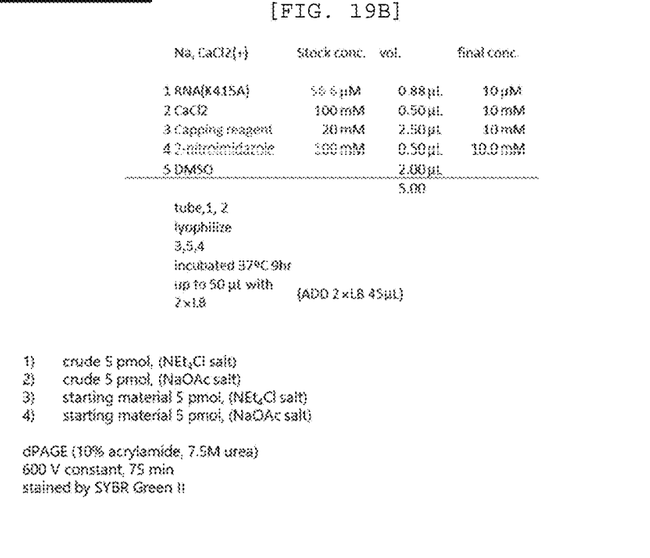

The outline of the experiment is illustrated in FIG. 19A. The counter salts used herein were tetraethylammonium salt (NEt$_4$Cl), and sodium acetate salt (NaOAc).

[Capping Reaction]

RNA solution and CaCl$_2$ solution were placed in an Eppendorf tube, and water was removed with a lyophilizer. m$^7$Gpp-Im, an imidazole derivative solution in DMSO, and DMSO for concentration adjustment were added.

Final concentrations were adjusted to 10 µM for RNA, 10 mM for CaCl$_2$, 10 mM for m$^7$Gpp-Im, and 10 mM for 2-nitroimidazole.

Figure 19C:
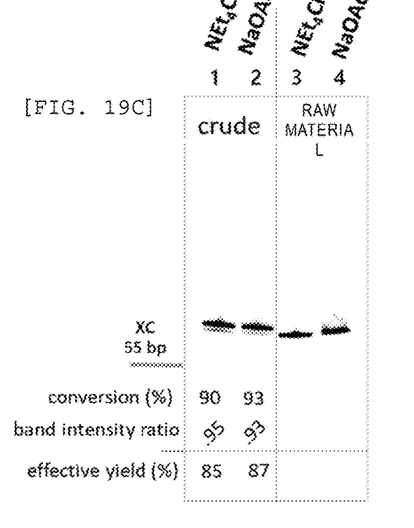

The reaction liquid was incubated at 37° C. for 9 hours, a part of the reaction liquid was then mixed with 2× loading buffer, and analyzed by gel electrophoresis (10% acrylamide, 7.5 M urea). Results of the electrophoresis are illustrated in FIG. 19C.

(2) Results

The results taught that the reactivity remained unchanged with use of either the tetraethylammonium salt or the sodium acetate.

The invention claimed is:

1. A method for producing a capped RNA which is an RNA having a 5'-end modified with a cap, the method comprising:
    reacting an activated capping compound represented by Chemical Formula 1 and a monophosphate RNA having the 5'-end monophosphorylated in the presence of a heteroaromatic compound, a metal salt, and a solvent:

[Chemical Formula 1]

where, L represents a leaving group.

2. The method for producing a capped RNA according to claim 1, wherein the activated capping compound is a compound represented by Chemical Formula 2, {Chemical Formula 2]

3. The method for producing a capped RNA according to claim 1, wherein the metal salt is a calcium salt.

4. The method for producing a capped RNA according to claim 1, wherein a reaction temperature is 30 to 60° C.

5. The method for producing a capped RNA according to claim 1, wherein a reaction time is 1 to 25 hours.

6. The method for producing a capped RNA according to claim 1, wherein the solvent is an organic solvent that contains 0 to 20% by weight of water.

7. The method for producing a capped RNA according to claim 1, wherein a concentration of the activated capping compound is 5 to 30 mM.

8. The method for producing a capped RNA according to claim 1, wherein the heteroaromatic compound is 1-methylimidazole.

9. The method for producing a capped RNA according to claim 1, wherein the heteroaromatic compound is 2-nitroimidazole.

* * * * *

UNITED STATES PATENT AND TRADEMARK OFFICE
CERTIFICATE OF CORRECTION

PATENT NO. : 12,448,408 B2
APPLICATION NO. : 17/802680
DATED : October 21, 2025
INVENTOR(S) : Hiroshi Abe et al.

Page 1 of 1

It is certified that error appears in the above-identified patent and that said Letters Patent is hereby corrected as shown below:

In the Claims

Column 16, Line 30, Claim 2, delete "{Chemical" and insert -- [Chemical --

Signed and Sealed this
Tenth Day of February, 2026

John A. Squires
*Director of the United States Patent and Trademark Office*